United States Patent [19]

Wright

[11] 4,250,521
[45] Feb. 10, 1981

[54] VIDEO SIGNAL DROPOUT COMPENSATOR

[75] Inventor: David I. Wright, Riverton, N.J.

[73] Assignee: RCA Corporation, New York, N.Y.

[21] Appl. No.: 59,112

[22] Filed: Jul. 19, 1979

[51] Int. Cl.³ .................. H04N 5/76; H04N 5/78; H04N 5/93
[52] U.S. Cl. .................. 358/8; 358/21 R; 360/38
[58] Field of Search .................. 358/8, 21; 360/36, 38

[56] References Cited

U.S. PATENT DOCUMENTS

| | | | |
|---|---|---|---|
| 3,463,874 | 8/1969 | Hodge et al. | 358/8 |
| 3,586,762 | 6/1971 | Hodge et al. | 358/8 |
| 3,679,814 | 7/1972 | Barslay | 358/8 |
| 3,949,416 | 4/1976 | Stalley et al. | 358/8 |
| 4,021,852 | 5/1977 | Hurst et al. | 360/38 |
| 4,032,966 | 6/1977 | Kenney et al. | 358/8 |
| 4,122,489 | 10/1978 | Bolger et al. | 358/21 |

Primary Examiner—Bernard Konick
Assistant Examiner—Aristotelis M. Psitos
Attorney, Agent, or Firm—Eugene M. Whitacre; William H. Meagher; Scott J. Stevens

[57] ABSTRACT

A video signal dropout compensator stores information from at least one incoming television line which is represented by a plurality of samples of combined luminance and chrominance signal components. The samples occur at a rate equal to four times the chrominance subcarrier frequency. When a signal dropout is detected in one or more of the samples, a replacement sample is generated using samples from at least one adjacent television line. The value of the sample on the adjacent line at the horizontal location, corresponding to the dropout sample, is subtracted from the sum of the samples before and after this corresponding location sample. The resultant value gives a dropout replacement sample with proper chrominance phase having a close approximation of the correct luminance value.

8 Claims, 4 Drawing Figures

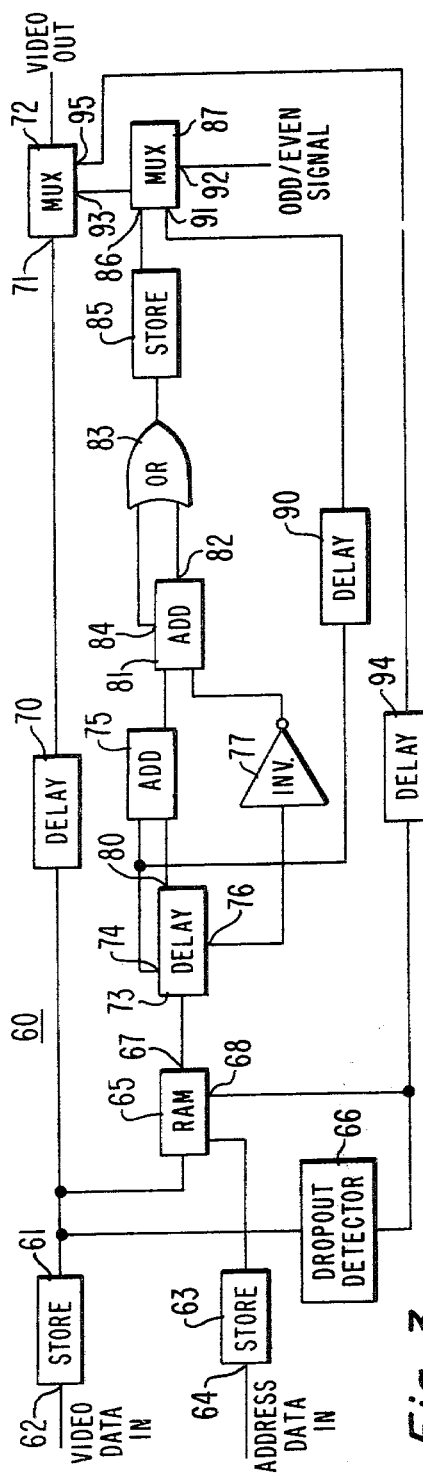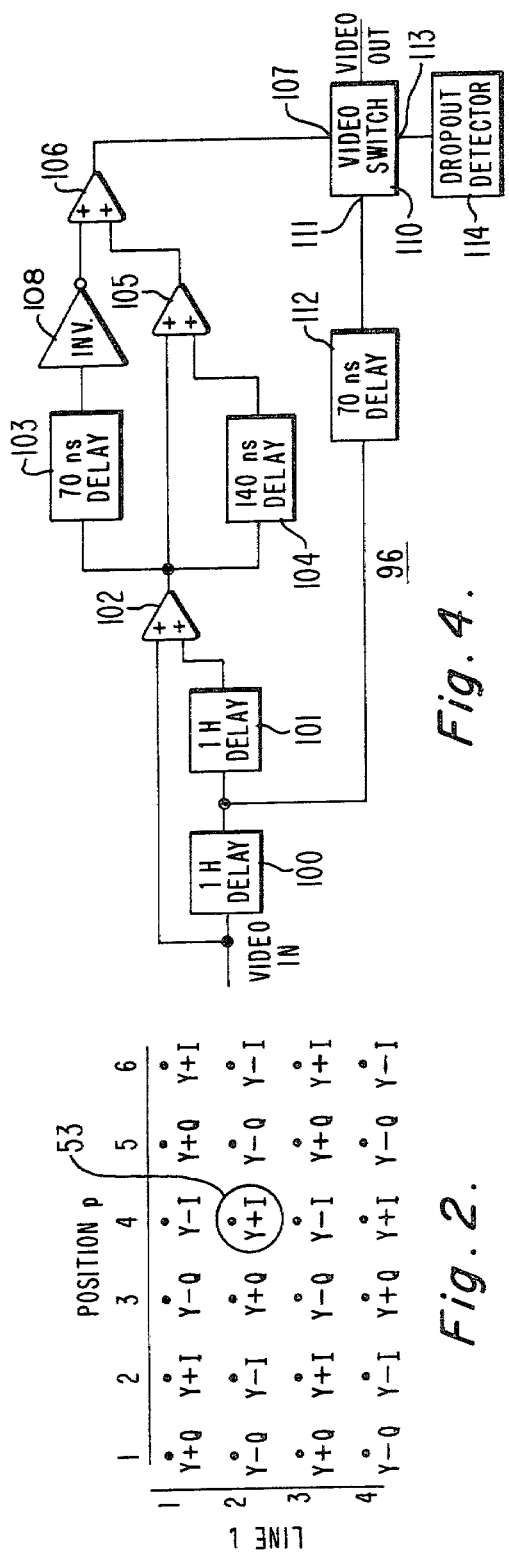
Fig. 3.
Fig. 4.
Fig. 2.

VIDEO SIGNAL DROPOUT COMPENSATOR

BACKGROUND OF THE INVENTION

This invention relates to video signal dropout compensators providing compensation for luminance and chrominance signal components.

The broadcasting of prerecorded television programs is often complicated by the presence of defects in the broadcast signal that were not present in the original signal when it was recorded. When the defect results in the loss of the video signal or the presentation of an incorrect signal, the defect is termed a signal dropout. When the recording medium is video tape, the dropout can be caused by an accumulation of dirt on the recorder heads or on the tape itself, or by a defect in the manufacture of the tape. With recordings on video discs, defects, such as manufacturing imperfections or scratches in the disc surface or dirt accumulation in the record grooves, can result in the occurrence of a signal dropout. The dropout may appear on the television receiver as a light or dark spot or streak. If the recording contains a large number of dropouts, the displayed picture can be very annoying to the viewer. To eliminate the annoying aspects of these signal dropouts, a form of dropout compensation is needed.

All dropout compensators generate a replacement signal, but they can operate in several different ways. One type of dropout compensator merely replaces every signal dropout with an average value replacement signal, which appears as gray, based on the theory that an average gray picture signal will come close to approximating the actual television picture that was lost in most dropout instances and will therefore present a much less annoying picture to the viewer. This type of dropout compensation, however, presents problems when the dropout occurs in a picture area that is either very light or very dark, making the gray replacement signal a poor approximation. Even poorer results occur when color television signals are involved, as the gray dropout replacement is even more noticeable in color than with the monochrome picture. Since almost all programming today is in color, this method is seldom used.

A popular method of dropout compensation replaces the defective signal with video information from the corresponding location on the previous television line. This method works fairly well in theory because the television information is largely redundant from one line to the next. Problems arise in practice however, due to the fact that standard color television signals employ a phase shift of the chrominance signal component between each television line in a television field. In the NTSC system, the chrominance phase shift between lines of a given field is 180°. Merely replacing defective information with video information from the previous line would result in a replacement signal having its chrominance component 180° out of phase, giving a complementary color display, which is objectionable to the viewer.

Replacement information may be taken within the same field from the second line prior to the dropout line to provide proper chrominance phase of the replacement signal, but the degree of dropout signal approximation is greatly reduced. Because of field interlace, information from two lines before the dropout line in a given field seems to come from four lines before when viewed on a TV receiver. In order to use the previous line information from a given field, the chrominance phase must be changed by 180°. A common technique used in prior art dropout compensators was to filter the video signal to separate the luminance and chrominance components, invert the chrominance component to change its phase by 180° and then recombine the luminance and phase-shifted chrominance to give a dropout replacement signal. This method is satisfactory as long as the theory that video information is redundant from line to line is correct. Often the nature of the particular television picture results in incorrect dropout replacement when only information at the same horizontal location from the previous line is used. U.S. Pat. No. 4,122,489 of Bolger et al. describes a method in which information from both the lines previous and subsequent to the dropout line in used to form a replacement signal. Although Bolger's method uses the video information which occurs at horizontal locations in the television lines before and after the dropout location, information at the corresponding horizontal dropout location in the preceding and subsequent lines is ignored. Also, Bolger's technique develops the information from information locations occurring at two samples before and two samples after the dropout point, so that the averaged replacement value has the proper chrominance phase. This somewhat remote selection of samples for a replacement signal tends to degrade the quality of the dropout signal approximation.

It would be advantageous to provide a video signal dropout compensator which generates a dropout replacement signal which is a closer approximation to the signal dropout than the described prior art.

SUMMARY OF THE INVENTION

A video signal dropout compensator forms a replacement signal for a video signal dropout occurring in a television line. The dropout compensator comprises means for providing a video signal from at least one television line adjacent to the line in which the dropout occurred. A first dropout replacement component is provided which comprises a signal value from said video signal at a horizontal position corresponding to the position of said dropout within a television line. A second replacement component comprises a signal value from said video signal at a horizontal position corresponding to one-quarter cycle of the chrominance subcarrier frequency immediately preceding the dropout. A third replacement sample component is also provided which comprises a signal value from said video signal at a horizontal position corresponding to one-quarter cycle of the chrominance subcarrier frequency immediately following the dropout. The first, second and third dropout replacement components are then combined to provide a dropout replacement signal.

BRIEF DESCRIPTION OF THE DRAWING

FIG. 2 is a table illustrating the chrominance phase relationship between information samples in a television line;

FIG. 3 is another form of dropout compensator of the present invention, also using digital sampling techniques; and FIG. 4 is a form of dropout compensator of the present invention using analog signals.

DETAILED DESCRIPTION

Figure 1:
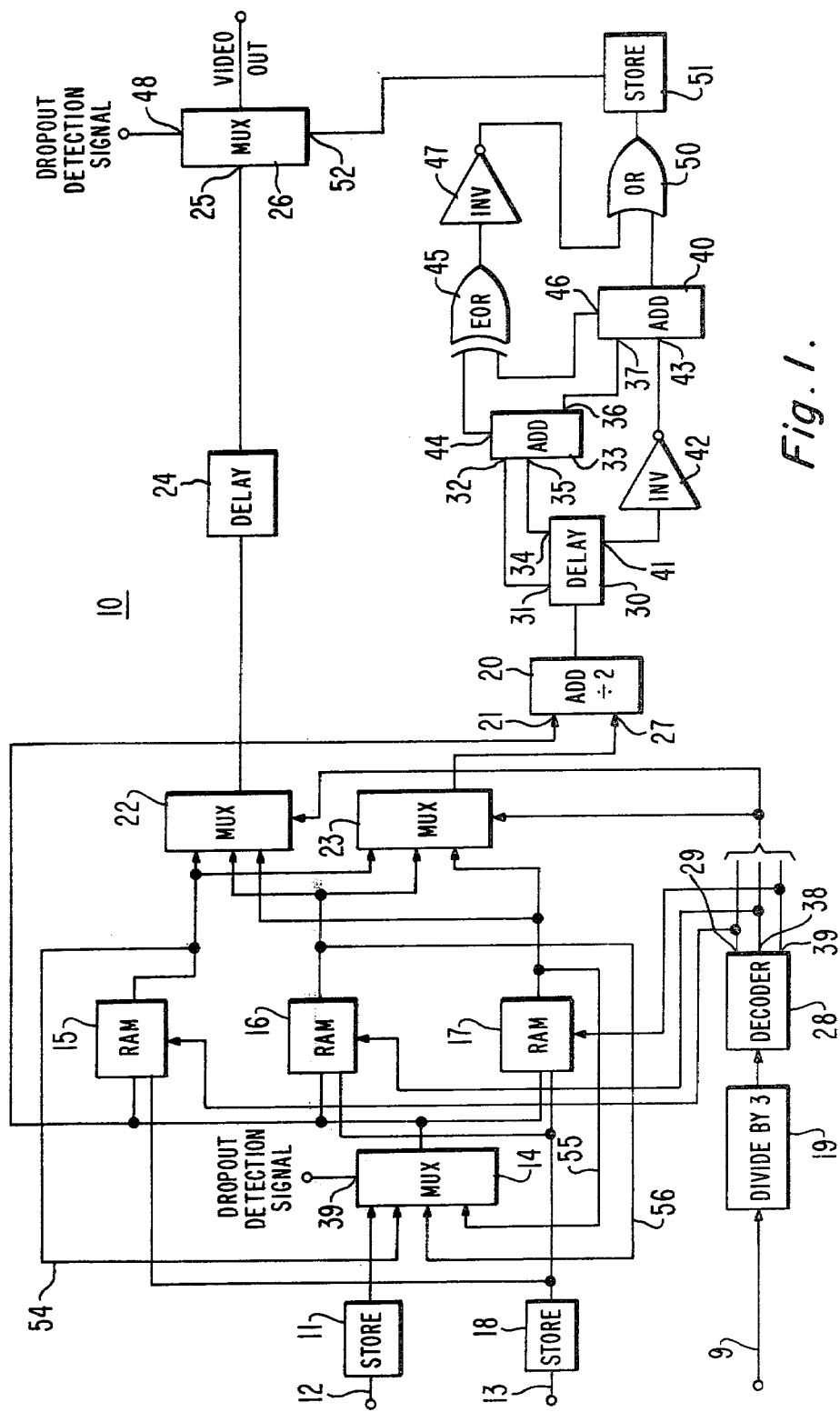
FIG. 1 is a block diagram of a signal dropout compensator of the present invention using digital sampling techniques.

Referring to FIG. 1, there is shown a video signal dropout compensator 10 for providing a dropout replacement signal for replacing a defect in a television signal. The dropout compensator 10 may be implemented as a portion of a digital video time base corrector, such as the RCA TFS 121 Frame Synchronizer. The dropout compensator 10 comprises a data input storage device 11 having a data input line 12 and an address input storage device 18, having an address input line 13. In the preferred embodiment, the data and address input lines 12 and 13 carry information from another portion of the video time base corrector. The time base corrector samples the analog video signal at a predetermined rate, and then digitally encodes these samples by using an analog-to-digital converter. The digital samples in the preferred embodiment are 10 bit words, with 9 bits representing encoded video information. A lesser or greater number of bits could be used, depending on the degree of resolution of brightness and color that is desired. For 9 bits a binary coded signal would have 512 steps of possible information. An additional 10th bit of the 10th bit coded signal is designated as a droput bit. When a video sample carries the dropout bit in its dropout-defining state, it indicates that a dropout has occurred in that sample. The digitally encoded information is therefore incorrect, and it is necessary that the sample be replaced.

The rate at which the time base corrector samples the video signal to develop digital samples is four times the chrominance subcarrier frequency, or $4 \times 3.58$ MHz, which equals 14.32 MHz. Since the horizontal scanning frequency in the NTSC system provides for 63.5 microseconds per line, including retrace time, a sampling rate of 14.32 MHz samples exactly 910 samples, or pixels, in each television line. Each pixel corresponds to one television picture element having 9 bits of video information.

The time base corrector sampling rate was chosen because of the phase relationship between the I and Q chrominance components of the video signal. The I and Q components are in quadrature; that is, they differ in phase by 90°. It is possible, therefore, by sampling the video signal four times during every subcarrier cycle, to assign one of four distinct chrominance codes to each of the video samples. These codes are of arbitrary designation, and by themselves are meaningless, but they represent particular chrominance phase relationships. The four possible sample codes or designations, including the luminance component, Y, that can occur, are $YL+Q$, $Y+I$, $Y-Q$, and $Y-I$. Because the video signal is a continuous wave, the sample codes form a repeating sequence with every fourth sample having identical sample codes. It is to be understood that the digital values of the Y, I, and Q components will of course differ from sample to sample, but the chrominance phase relationship will follow the coding sequence. This coding sequence can be seen more clearly in FIG. 2. The four code repeating sequence is identical in each line of video information. It can also be seen that the codes of corresponding samples in adjacent lines differ only by the sign of their chrominance components, indicating that the chrominance component of the video signal is phase shifted 180°, or one-half of a subcarrier cycle from line to line.

The repetitious nature of the sample codes allows the present invention to generate a replacement signal having a close approximation to the missing or defective video signal. In the preferred embodiment, the replacement signal is derived from six samples which surround the dropout sample. Three samples are selected from the television line immediately preceding the line in which the dropout is detected. The line in which the dropout is detected is designated as the dropout line. The remaining three samples are selected from the line immediately following the dropout line. These lines are all within one television field. Another embodiment requiring only three samples from the line preceding the dropout will be described later.

The samples from which the replacement signal is derived are the samples above and below the dropout sample and the samples immediately preceding and immediately following the samples above and below the dropout sample; i.e., one-quarter cycle of the subcarrier frequency before and after the dropout. In FIG. 2, samples are designed as $S_{1p}$, where 1 equal line number, and p equals position number. A replacement signal for dropout 53, designated $S_{24}$, would be derived from samples $S_{13}$, $S_{14}$, $S_{15}$, $S_{33}$, $S_{34}$, and $S_{35}$.

The dropout replacement signal is formed by combining the digital values of the six replacement samples in the following manner. The four samples in the lines prior and subsequent to the dropout line at horizontal positions preceding and following the samples directly above and below the dropout sample are summed and an average of that sum is determined. The average of the sum of the two samples directly above and below the detected dropout sample is then subtracted from the four point average to give a replacement signal which closely approximates the dropout signal. For dropout 53 in FIG. 2, the formula for calculating a replacement signal can be expressed:

Replacement for $S_{24}$ equals $$\frac{S_{13} + S_{33}}{2} + \frac{S_{15} + S_{35}}{2} - \frac{S_{14} + S_{34}}{2}$$

By replacing the sample location designations with the corresponding sample codes, the equation becomes:

Replacement for $S_{24}$ equals $$\frac{(Y-Q)+(Y-Q)}{2} + \frac{(Y+Q)+(Y+Q)}{2} - \frac{(Y-I)-(Y-I)}{2}$$

equals $$\frac{(2Y-2Q)}{2} + \frac{(2Y+2Q)}{2} - \frac{(2Y-2I)}{2}$$

equals $$2Y - Y + I = Y + I$$

which is equivalent to the sample code for sample $S_{24}$. A dropout replacement signal can be derived for virtually every sample in a television field by using the selection and computational process previously described. Dropouts occurring in the first and last line of the field, or in the first and last samples of each line, lack the necessary surrounding sample structure to employ the method directly. However, dropouts which occur at these relatively few locations will not be visible due to overscanning of the raster by the television receiver.

Storage device 11 receives the digital values of the samples on data input line 12. Sample address information necessary to correctly identify sample locations is provided by an address generator in the video time base corrector and is applied to storage device 18 over address input line 13. Storage devices 11 and 18 are data buffers which act as reclocking devices for sample data coming from the sampling portion of the digital video time base corrector. Some timing errors may be introduced into the digital signals due to the inability of the electronic components to respond accurately at the sampling frequency. Storage devices 11 and 18 output the digital sample and address values at the correct frequency, removing any timing errors that had been introduced.

The reclocked digital sample signals from the data input storage device 11 are then applied to an input of a multiplex circuit (MUX) 14. The dropout detection signal is also applied to input 39 of MUX 14. The output of MUX 14 is connected to one input of each of the random access memories (RAMs) 15, 16, and 17. The output from the multiplex circuit 14 is also connected to an input of an adder/divider 20. The output of the address input storage device 18 is connected to the address input of each of the RAMs 15, 16, and 17. A divide-by-three counter 19 receives horizontal rate pulse information on input 9 from the video time base connector. The output of counter 19 is connected to the input of decoder 28. The output of decoder 28 comprises outputs 29, 38 and 39. Output 29 is connected to another input of RAM 15. Output 38 is connected to an input of RAM 16 and output 39 is connected to an input of RAM 17. Each of the outputs 29, 38 and 39 are also connected to inputs of multiplex circuits 22 and 23. In order to simplify the drawing, the three connections to multiplex circuits 22 and 23 from the decoder 28 are shown as a single line.

The output of random access memory 15 is connected to an input of each of multiplex circuits 22 and 23. The outputs of each random access memories 16 and 17 are also connected to an input of multiplex circuits 22 and 23 in a similar fashion. The outputs of random access memories 15, 16 and 17 are also connected back to inputs of multiplex circuit 14. The lines of video samples are read out of the multiplex circuit 14 and sequentially stored in the RAMs 15, 16, and 17 in the following manner. The counter 19 receives horizontal line sync information comprising horizontal rate pulses from the time base corrector along input line 9. The output from the divide-by-three counter 19 is signal coded to have one of three possible values. The decoder 28 processes this coded signal and generates a signal output at one of the outputs 29, 38 or 39 based on the value of the code. Each of the outputs 29, 38 and 39 is connected to a particular RAM 15, 16, or 17. A signal at one of the outputs 29, 38 or 39 causes the associated RAM to write the sample data from the multiplex circuit 14 into its storage at the address location provided by the address generator. The address generator is reset to zero after every line by the horizontal rate pulses. The decoded output signal from the decoder 28 is also applied to inputs of the multiplex circuits 22 and 23. This decoded signal causes the multiplex circuits 22 and 23 to select the two RAMs which are not storing sample data to read out the data which was previously stored. The output signal from the decoder determines the RAM selected by each of the multiplex circuits 22 and 23. The three possible coded signals from the counter 19 will occur sequentially, so that one particular RAM will be selected to write sample data into its memory by one out of every three horizontal rate pulses.

In the preferred embodiment, each of the RAMs 15 16, and 17 contains 10 memory units each having 1K bits of storage to accommodate the 910 samples per line. Since each sample contains 10 bits (including the dropout bit), 10 memory units are needed to store one line of video data. It was found that only RAM units having a single bit input channel provided sufficiently fast response for real time applications. It is contemplated that RAMS with larger storage having a greater number of access channels and greater access speeds will be used when available. As previously described, the output from the decoder 28 controls the read/write operation of RAMs 15, 16, and 17 so that as data from storage unit 11 is being written into or stored in one of RAMs 15, 16, or 17, data is being read from the other two RAMs. Because of the sequential storage of lines of samples, the three lines that are stored in RAMs 15, 16, and 17 at any particular time represent lines of video signals that occurred sequentially in time when they were recorded. If a signal dropout is detected in the middle line of the sequence, the other two stored lines correspond to the line preceding and the line following the dropout line. It should be recalled that these are the lines necessary to generate a dropout replacement signal according to one method of the present invention. It is possible then, through the function of multiplex circuits 22 and 23, to always detect dropouts in the middle line of the stored sequence in order to provide the necessary samples from which to derive the correct replacement signal. As each subsequent line is stored, the other lines will move down within the sequence so that one line will enter the sequence as the line following the dropout line, change to the current or dropout line as the next line is stored, and change again to the line before the dropout line as another line is stored.

Multiplex circuits 22 and 23 receive the lines of samples from RAMs 15, 16 and 17. Multiplex circuit 22 always receives data from the RAM which contains the current or dropout line. Multiplex circuit 23 always receives data corresponding to the line of video information preceding the line in which dropouts are being detected. Since the contents of each RAM continually changes states within the three-line sequence, the output of each RAM must be connected to an input of both multiplex circuits 22 and 23. The control and sequencing circuitry previously described in connection with the outputs of decoder 28 determines which of RAM's 15, 16, and 17 will read into multiplex circuits 22 and 23.

The output from multiplex circuit 22 is processed by delay means 24 and applied to input 25 of multiplex circuit 26. This signal becomes the output of dropout compensator 10 whenever no dropout is detected.

The output from multiplex circuit 23 is the preceding line data with respect to the dropout line and is applied to input 27 of the adder/divider 20. Input 21 of the adder/divider 20 receives the following line data with respect to the dropout line from the multiplex circuit 14. As previously described, this signal is being written into one of the RAMs 15, 16, and 17 to later be read as dropout line and preceding line data. The output from the adder/divider 20 is an average of the amplitude of the samples in the lines preceding and following the dropout line. The output from adder/divider 20 is represented by a series of digital signals occurring at a frequency equal to the video signal sampling rate.

The output of adder/divider 20 is applied to the input of delay means 30. Delay means 30 provides three different delay durations. Output 31 of delay means 30 is designed to provide a minimum of signal delay. Output 41 must provided a delay that is exactly one sampling cycle longer than the delay of output 31. Output 34 must provide a delay that is exactly two sampling cycles longer than the delay of output 31. The actual delay times provided by delay means 30 are unimportant, as long as the relative difference between the delay times is exact. The three outputs from delay means 30 then represent the averaged sample data from adder/divider 20 at three distinct points in time. Each point in time corresponds to a different sample position as illustrated in FIG. 2. If the signal at output 41 is selected to represent the corresponding horizontal raster or line position to the detected dropout sample, designated as position 4 in FIG. 2, then the lesser delayed signal at output 31 will represent the horizontal raster position following the dropout position (position 5 in FIG. 2 and the greater delayed signal at output 34 will represent the preceding horizontal raster position (position 3 in FIG. 2). By applying the signal at outputs 31 and 34 of delay 30 to the inputs 32 and 35 of adder 33, the signal at output 36 of the adder 33 will be an average of the four samples before and after the samples directly above and below the detected dropout sample. This signal is applied to input 37 of adder 40.

The signal at output 41 of delay means 30, representing the average value of the sum of the samples directly above and below the dropout sample, is applied to the input of an inverter 42 and then applied to input 43 of adder 40. The inverter 42 allows the adder 40 to act as a subtractor with respect to the signal at input 43. The output from adder 40 then is the difference between the average video signal value of the four samples surrounding the dropout and the average video signal value of the two samples directly above and below the dropout sample. This results in generation at the output terminal of adder 40 at the desired dropout replacement signal according to the method previously described.

Although the output from adder 40 could be used directly as a dropout replacement signal, it is possible that errors in the replacement signal can occur if the capacity of either adder 33 or 40 is exceeded. This can happen if the area in which the highlight occurred was either very light or very dark, corresponding to very small or very large digital sample values. If the capacity of the sample bit registers is exceeded, the overflow high order bit may be lost, resulting in the displaying of a light colored dropout as dark, or a dark colored dropout as light.

In order to prevent such overflow errors from causing an incorrect dropout replacement signal, an overflow monitor circuit is employed. The overflow output 44 from adder 33 is connected to one input of an exclusive or (EOR) logic gate 45. The overflow output 46 of adder 40 is connected to the other input of gate 45.

The output from gate 45 is connected to the input of an inverter 47. The output from inverter 47 is connected to one input of an OR gate 50. The output of the adder 40 is connected to the other input of gate 50. The overflow monitor circuit provides a suitable dropout replacement signal in the event an overflow of the data registers of adder 33 cause the output of adder 40 to output an incorrect value due to an incorrect signal at input 37 or adder 40, caused by the sum of the signal at inputs 32 and 35 exceeding the storage capability of adder 33.

The output from gate 50 is the correct dropout replacement signal, free of any overflow generated errors. This signal is applied to the input of storage device 51. Storage device 51 operates in the same manner as input storage device 11, acting as a data reclocking means to remove any timing errors that were introduced by the dropout compensating circuit. The output of the storage device 51 is applied to input 52 of the multiplex circuit 26.

As described previously, each digitally encoded sample applied from the time base corrector on input line 12 also comprises a dropout bit which indicates whether a signal dropout has occurred in that sample. The detection of the dropout and its designation by the presence of a logical "1" for the dropout bit is done by the digital time base corrector during sampling and encoding of the video information signal. The status of the dropout bit also comprises the dropout detection signal applied to input 39 of MUX 14 and input 48 of MUX 26. The detection of the dropout can be accomplished in several ways. One common way is to monitor the video RF carrier wave. Absences or disruptions in the carrier indicate the presence of a signal dropout. It is to be understood that signal dropouts do not typically occur as individual samples, but rather as a series of samples during a television line. The edges of the dropout are not sharply defined, and the quality of the signal may decrease gradually. In order to provide an effective replacement signal, it is desirable to begin replacing samples some time prior to the actual detection of a dropout by the detection circuitry. Signal processing delays are sufficient, however, to permit this prior replacement of samples even trough the dropout was actually detected at a later point in time.

Multiplex circuit 26 selects its output from either input 25 or input 52 based on the status of the dropout detection signal at input 48. When the dropout detection signal indicates that no dropout has occurred at that sample, the multiplex circuit 26 selects the signal at input 25, which is the output from multiplex circuit 22 that has been processed through delay means 24. As mentioned previously, this signal represents digital sample data from the middle line of the three-line stored sequence, the line designated as the dropout line. This is also the current video line that is to be broadcast or displayed. When no dropout is detected, this signal is used directly, since no dropout replacement is required.

When the dropout detection signal indicates the presence of a signal dropout, the dropout samples are replaced by the replacement signal present at input 52 of multiplex circuit 26. The output of multiplex circuit 26 during the occurrence of a dropout then is the signal at input 52. The delay duration of delay means 24 is adjusted to equal the delay of the dropout signal replacement circuit so that uncompensated and replacement signals having identical sample positions in the video line are present at the inputs of multiplex circuit 26 at the same time.

During normal operation, the output of multiplex circuit 26 will be primarily taken from input 25, since the majority of the video signal will be free of dropouts. When dropouts are detected in any samples, those samples will be replaced by the replacement signal at input 52, giving a dropout free signal from the muliplex circuit output. The previously described method of combining samples to form a video signal having correct chrominance phase allows samples having positions directly preceding and following the dropout position to be used, resulting in a much closer approximation to the dropout signal than was possible with the prior art.

There are times when a signal dropout may extend over several video lines at the same sample position within the line. This may occur during replay of a recorded tape due to dirt or debris that has collected on the playback head of the video tape player. When such a condition occurs, the previously described method of deriving a dropout replacement signal cannot be used, since the required samples are unavailable. The dropout compensator 10 is adapted to generate a dropout replacement signal even in the presence of multiple line dropouts.

The problem of multiple line dropouts is solved by feeding back the outputs of RAMs 15, 16, and 17 into the input of muliplex circuit 14. FIG. 1 illustrates the feedback lines 54, 55, and 56 and connected between the outputs of RAMs 15, 16, and 17 and the inputs of multiplex circuit 14. When the dropout detection signal supplied by the video time base corrector is present at input 39 of multiplex circuit 14, the multiplex circuit 14 rewrites the signals from the lines preceding the first multiple line dropout into the RAMs. The samples from these lines can be continually rewritten into the RAMs as long as the multiple dropouts last. The signals at inputs 21 and 27 of adder/divider 20 will then be from the same video line, and the dropout replacement signal will be effectively derived from one line. When a replacement signal is derived in this manner, only three distinct samples are used, but the algebraic combination is identical to the six sample method.

FIG. 3 illustrates an alternate dropout compensator 60 which derives a dropout replacement signal using three samples from only one video line. This is much simpler than the six sample circuit in FIG. 1, and requires much less data storage space, but it does not produce as accurate a replacement signal as does the circuit in FIG. 1.

The dropout compensator 60 comprises a data storage device 61 having an input 62 and an address storage device 63 having an input 64. The data and address storage device 61 and 63 reclock the incoming signals at inputs 62 and 64 to the correct sampling frequency, thereby removing any timing errors that may have been introduced into the signals. The outputs from the storage devices 61 and 63 are applied to the inputs of the random access memory (RAM) 65. The output from the data storage device comprises television lines of video signals, represented as a series of digitally encoded samples, which are generated in the same manner as that described in connection with the dropout compensator 10. The address information from address storage device 63 identifies the location of the samples within the line. The RAM 65, which may be a parallel configuration of RAMs so described previously in connection with dropout compensator 10, has a capacity to store one complete television line of samples. The digital sample data is written into RAM 65 until a dropout is detected. When one video line is completely stored or written into RAM 65, storing begins for the next video line, erasing existing data in the RAM as the new data is written in.

The output from the data storage device 61 is also applied to the input of the dropout detector 66. The dropout detector 66 monitors the status of the dropout bit of each digital sample. When a dropout is detected, a signal occurs at the output of the dropout detector 66. This signal is then applied to one input of the RAM 65. The presence of this signal at the RAM input causes the storing of new information to cease. The existing stored data is then read out of the RAM at output 67. This existing data will continue to be used in the event multiple line dropouts occur. The signal from the dropout detector 66 is applied to the RAM 65 at input 68 to inform the RAM 65 that a dropout has occurred. The signal from the dropout detector 66 is applied to RAM 65 before the detector dropout sample has been written into the RAM. The timing of the dropout detector signal provides that sufficient previously stored data remains in RAM 65 to permit the dropout replacement signal to be correctly generated. By regulating the lead time by which the dropout detector signal precedes the actual storage of that sample, the number of samples that are replaced before the actual dropout occurs can be controlled, resulting in a smooth appearance of the displayed video signal. The output from the data storage device 61 is also processed by delay means 70 before being applied to input 71 of mutliplex circuit 72.

The signal at output 67 of RAM 65 is applied to the input of delay means 73. Delay means 73 provides three different delay periods to generate the three samples necessary to derive the dropout replacement signal. Output 74 of the delay means 73 produces a nominal delay duration, which may even be no delay. The signal at output 74 is applied to one input of adder 75 and represents samples occurring immediately following the sample directly above the detected dropout sample in the adjacent preceding line. Output 76 of the delay means 73 provides a delay duration that is longer than the delay of output 74 by exactly one cycle of the sampling frequency. The signal at output 76 is applied to the input of inverter 77 and represents samples that are directly above the detected dropout sample. Output 80 of the delay means 73 provides a delay having a duration of exactly two sample cycles longer than the delay at output 74. The signal at output 80 is applied to another input of adder 75 and represents samples occurring immediately preceding the sample directly above the detected dropout sample. The signals at outputs 74, 76, and 80 of delay means 73 therefore provide the required sample positions necessary to derive the dropout replacement signal.

The output from the adder 75 is a signal representing the sum of the digital sample values from positions before and after the sample directly above the detected dropout sample (positions 3 and 5 in FIG. 2).

The signal is applied to one input of adder 81. The output from the inverter 77 is a signal representing the negated value of the sample value at the position directly above the dropout sample (position 4 in FIG. 2). This signal is also applied to an input of adder 81. The signal at output 82 of adder 81 is the difference between the signals at the two inputs. This signal is the desired dropout replacement signal. The method of combining the three sample signals from the line preceding the dropout line is the same as the method of combining the average of the sum of the samples taken from the line preceding and following the dropout line in the six sample method previously described.

In order to guard against the occurrence of overflow errors in the dropout replacement signal, logic gate 83 is used as an overflow monitor. The overflow signal, present at output 84 of the addier 81, is applied to one of the inputs of the logic gate 83. The dropout replacement signals from output 82 of adder 81 is applied to the other input of logic gate 83. Logic gate 83 performs a logical OR operation, giving a logical "1" output if either one or both of the inputs is a logical "1". If an overflow condition exits, indicating the presence of a very large input signal, a logical "1" will be present at output 84 and will be applied to the input of logic gate 83. This will result in the output of the logic gate 83 being a digital word with every bit represented as a logical "1", corresponding to the maximum possible signal value, regardless of the actual input value of the dropout replacement signal from the adder 82. This assures that the actual dropout replacement signal used will not be grossly incorrect due to the presence of an overflow condition of adder 81, since the signal which caused the overflow condition would have been very large. If no overflow condition exists, the signal at output 84 will be logical "0" and the output of the logic gate 83 will be identical to the input signal coming from the adder 81.

The output from logic gate 83 is applied to the input of a storage device 85 which reclocks the signal in the same manner as the data storage device 61 to remove timing errors. The output from the storage device 85 is applied to input 86 of multiplex circuit 87. As previously described, sample information from the video line preceding the dropout line is repeatedly used to derive dropout replacement signals for multiple line dropouts because information from lines in which dropouts occur are not written into RAM 65. The replacement signal derivation method previously described in detail in connection with the six sample dropout replacement and used here as a three sample dropout replacement will generate a replacement signal having correct chrominance phase only for dropouts occurring in odd numbered lines following the replacement signal line. For dropouts occurring in an even number of lines following the replacement signal line, the video chrominance component of the replacement signal will be 180° out of phase with the chrominance component of the dropout signal that is to be replaced.

Two replacement signals are necessary to provide a correct replacement for multiple line dropouts. One signal of course is the derived dropout replacement signal previously described, which phase shifts the video chrominance component of the corresponding position sample by 180° to replace a signal dropout in the line following the sample line. The sample directly below the dropout sample in the video line following the dropout line (two lines after the original sample line) has the same chrominance phase as the sample directly above the dropout sample. It is not necessary, therefore, to combine any samples to provide correct chrominance phase in that case. A suitable dropout replacement signal is formed by merely replacing the dropout directly with the sample directly above from the original sample line (two lines before). If the dropout occurs for several more lines, it is possible to provide a replacement signal by alternately replacing the dropout with the derived replacement signal in one line and the sample directly above in the next line.

The signal at output 74 of delay means 73 is processed by delay means 90 and then applied to input 91 of multiplex circuit 87. The multiplex circuit 87 can select for a dropout replacement either the signal input 86, which is the derived chrominance phase-shifted replacement signal, or the signal at input 91, which is the sample directly above the dropout sample from the original sample line. Delay means 90 is adjusted so that replacement samples having the same relative positions within the video line are present at the input of the multiplex circuit 87 at the same time. The signal at input 92 of the multiplex circuit 87 is the result of a comparison between an odd/even signal generated by the time base corrector based on the horizontal sync information and the status of an odd/even bit that is added to each signal sample when it is stored in RAM 65. This signal informs the multiplex circuit 87 to select either the derived replacement signal or the direct video signal. The output from the muliplex circuit 87 is applied to input 93 of multiplex circuit 72.

The multiplex circuit 72 selects its output from either the signal at input 71, which is the delayed output directly from the input storage device 61, or the signal at input 73 which is a dropout replacement signal. The multiplex circuit 72 selects its input based on whether a dropout has occurred in the video signal. The signal from the output of the dropout detector 66 is delayed by delay means 94 and then applied to input 95 of the multiplex circuit 72. This signal is the status of the dropout bit of the video samples. Based on this signal, the multiplex circuit 72 determines if a dropout has occurred at the samples present at its inputs and selects the appropriate signal accordingly. Delay means 94 is adjusted so that dropout bit status information is present at the input of multiplex circuit 72 at the appropriate time to replace the associated dropout signal samples. The output of the multiplex circuit 72 is a dropout-free video signal that may undergo whatever further processing is desired. It is clear that although the three sample dropout compensator does not provide as good an approximation of the dropout signal as does the six sample dropout compensator, many of the advantages of the six sample system are also present with the three sample dropout compensator.

The preceding descriptions relating to analogous three sample and six sample dropout compensators have dealt exclusively with digitally encoded samples generated by a digital video time base corrector. It is possible to process the analog video signal in a corresponding manner to generate an analog dropout replacement signal. The circuit illustrated in FIG. 4 could be used to perform direct analog signal processing of this type.

FIG. 4 illustrates a dropout compensator 96 comprising an input line 97 and two delay means 100 and 101. The signal on input line 97 is a television video signal that had been previously recorded. This signal is applied to the input of delay means 100. The signal output of delay means 100 is applied to the input of delay means 101. The signal output of the delay means 101 is applied to one input of a summing amplifier 102. The signal on input line 97 is also applied to the other input of summing amplifier 102.

Delay means 100 and 101 each have a signal delay duration of one television line, or 63.5 microseconds in the NTSC system. The output of delay means 101 is therefore a signal which has been delayed by two television lines. The combination of this signal and the undelayed video signal on input line 97 by the summing amplifier 102 provide a signal at the output of the summing amplifier 102 that is the average signal value of two television signals, one occurring two lines of a field before the other. It is recalled from the description of dropout compensator 10 that a dropout replacement signal was derived from selected samples chosen from the average signal value of the television line before and after the line in which the dropout occurred. The average signal used in dropout compensator 10 is equivalent to the signal at the output of summing amplifier 102.

The concept of designating video samples with particular chrominance sample codes such as was described in dropout compensator 10 and 60 can also be employed with the analog signals of dropout compensator 96. This is true because samples taken at the previously discussed digital rate (14.32 MHz) will produce the same repeating pattern of chrominance sample codes that are present in the analog signal. Delay means 103 and 104 produce analog delays equivalent to one and two digital sample period delays, respectively, in order to develop the three positions within the line that are necessary to produce the desired dropout replacement signal. At a digital sampling rate of 14.32 MHz, each sample period has a duration of 70 nanoseconds. The analog delay period is therefore 70 nanoseconds for delay means 103 and 140 nanoseconds for delay means 104.

The output of summing amplifier 102 is simultaneously applied to the input of delay means 103, summing amplifier 105 and delay means 104. The output from the delay means 105 is also applied to the input of summing amplifier 105. The output of summing amplifier 105 is a signal which is the sum of the signal values taken at points that are 140 nanoseconds apart. The signal is applied to one input of a summing amplifier 106.

The output of delay means 103 is processed by an inverter 108 which reverses the polarity of the signal. This signal is then applied to another input of summing amplifier 106, which produces a signal at its output whose value is the difference between the signal output of summing amplifier 105 and the output of delay means 103. Since the output of delay means 103 represents a signal occurring in time between the signals combined by summing amplifier 105, the output of summing amplifier 106 produces a signal which is the algebraic equivalent of the desired dropout replacement signal of dropout compensator 10. This dropout replacement signal from summing amplifier 106 is applied to input 107 of a video switch 110. The video switch 110 operates similarly to the multiplex circuit described in connection with dropout compensators 10 and 60, that is, it selects from a number of inputs based on an additional information signal. Input 111 to video switch 110 is the signal from the output of delay means 100, further delayed by 70 nanoseconds by delay means 112. The output from delay means 100 represents the current video line which occurs between the video lines combined by summing amplifier 102. This signal is delayed by delay means 112 to provide that equivalent time positions within the video lines which are present at the input of video switch 110 at the same time. Video switch 110 also receives a signal at input 113 from a dropout detector 114. The dropout detector 114 senses the presence of a signal dropout and informs the video switch at the proper time to select a replacement signal, (i.e., the signal at input 107). During normal operation, the number of dropouts detected will be relatively small and the output of video switch 110 will be the signal at input 111. It is understood that the signals at inputs 107 and 111 are continuous analog signals with the signal at input 107 being a derived replacement of the signal at input 111. It is possible, therefore, to select the replacement signal at input 107 at any time when a dropout is detected in the signal at input 111.

The method of dropout compensation described has been intended to be used with the NTSC color television system. It is possible, however, by varying sampling and sample combining techniques to use this form of dropout compensator with PAL television systems. A PAL dropout compensator requires two methods of sample combination, which alternate sample by sample across each television line. Some means of sample indexing or identification is therefore required in a PAL system that is not necessary in a NTSC dropout compensator.

What is claimed is:

1. A video signal dropout compensator for forming a replacement signal for a video signal dropout occurring in a television line, said dropout compensator comprising:

means for providing a video signal from at least one television line adjacent to the line in which said dropout occurred;

means for providing a first dropout replacement component comprising a signal value from said video signal at a horizontal position corresponding to the position of said dropout within a television line;

means for providing a second dropout replacement component comprising a signal value from said video signal at a horizontal position corresponding to one-quarter cycle of the chrominance subcarrier frequency immediately preceding said dropout;

means for providing a third dropout replacement component comprising a signal value from said video signal at a horizontal position corresponding to one-quarter cycle of the chrominance subcarrier frequency immediately following said dropout;

means for providing a dropout replacement signal comprising means for combining said first, second and third dropout replacement components; and means for replacing said dropout with said dropout replacement signal.

2. The video signal dropout compensator defined in claim 1 wherein said means for providing a dropout replacement signal comprises means for adding said second and third dropout replacement components together and subtracting said first dropout replacement component therefrom.

3. A video signal dropout compensator for forming a replacement signal for a video signal dropout occurring in a television line, said dropout compensator comprising:

means for providing a plurality of video signal samples from two television lines adjacent to the line in which said signal dropout occurred, said samples occurring at a rate equal to an integer multiple of four times the color subcarrier frequency;

means for combining the samples at identical horizontal positions in said two adjacent television lines to provide a single combined television line comprising the average value of the signal samples in said two adjacent lines;

means for providing a first dropout replacement sample component comprising the sample from said combined television line occurring at the same horizontal position as said dropout;

means for providing a second dropout replacement sample component comprising the sample from said combined television line immediately preceding the sample occurring at the same horizontal position as said dropout;

means for providing a third dropout replacement sample component comprising the sample from said combined television line immediately following the sample at the same horizontal position as said dropout;

means for providing a dropout replacement signal comprising means for adding said second and third dropout replacement sample components together and subtracting said first dropout replacement sample component therefrom; and means for replacing said dropout with said dropout replacement signal.

4. A video signal dropout compensator for forming a replacement signal for a video signal dropout occurring in a television line, said dropout compensator comprising:

means for providing a plurality of video signal samples in a television line adjacent to and preceding the line in which the signal dropout occurred, said samples occurring at a rate equal to an integer multiple of four times the color subcarrier frequency;

means for providing a first dropout replacement sample component comprising the sample from said adjacent television line at the same horizontal position as said dropout;

means for providing a second dropout replacement sample component comprising the sample from said adjacent line immediately preceding the sample at the same horizontal position as said dropout;

means for providing a third dropout replacement sample component comprising the sample from said adjacent television line immediately following the sample at the same horizontal position as said dropout;

means for providing a dropout replacement signal comprising means for adding said second and third dropout replacement sample components together and subtracting said first dropout replacement sample component therefrom; and means for replacing said dropout with said dropout replacement signal.

5. A method for forming a replacement signal for a video signal dropout occurring in a television line, comprising:

providing a video signal from at least one television line adjacent to the line in which said signal dropout occurred;

providing a first dropout replacement component comprising a signal value from said video signal at a horizontal position corresponding to the position of said dropout within a television line;

providing a second dropout replacement component comprising a signal value from said video signal at a horizontal position corresponding to one-quarter cycle of the color subcarrier frequency immediately preceding said dropout;

providing a third dropout replacement component comprising a signal value from said video signal at a horizontal position corresponding to one-quarter cycle of the color subcarrier frequency immediately following said dropout;

providing a dropout replacement signal by combining said first and second and third dropout replacement components; and replacing said dropout with said dropout replacement signal.

6. The method for forming a dropout replacement signal defined in claim 5 wherein the step of providing a dropout replacement signal comprises adding said second and third dropout replacement components together and subtracting said first dropout replacement component therefrom.

7. A method for forming a replacement signal for a video signal dropout occurring in a television line comprising:

providing a plurality of video signal samples from two television lines adjacent to the line in which said signal dropout occurred, said samples occurring at a rate equal to an integer multiple of four times the color subcarrier frequency;

combining the samples at the same horizontal position in said two adjacent television lines to provide a single combined television line comprising the average value of the signal samples in said two adjacent lines;

providing a first dropout replacement sample component comprising the sample from said combined television line occurring at the same horizontal position as said dropout;

providing a second dropout replacement sample component comprising the sample from said combined television line immediately preceding the sample occurring at the same horizontal position as said dropout;

providing a third dropout replacement sample component comprising the sample from said combined television line immediately following the sample occurring at the same horizontal position as dropout;

adding said second and third dropout replacement sample components together and subtracting said first dropout replacement sample component therefrom; and replacing said dropout with said dropout replacement signal.

8. A method for forming a replacement signal for a video signal dropout occurring in a television line, comprising:

providing a plurality of video signal samples in a television line adjacent to and preceding the line in which the signal dropout occurred, said samples occurring at a rate equal to an integer multiple of four times the video subcarrier frequency;

providing a first dropout replacement sample component comprising the sample from said adjacent television line at the same horizontal position as said dropout;

providing a second dropout replacement sample component comprising the sample from said adjacent line immediately preceding the sample at the same horizontal position as said dropout;

providing a third dropout replacement sample component comprising the sample from said adjacent television line immediately following the sample at the same horizontal position as said dropout;

adding said second and third dropout replacement sample components together and subtracting said first dropout replacement sample component therefrom; and replacing said dropout with said dropout replacement signal.

* * * * *

UNITED STATES PATENT AND TRADEMARK OFFICE
CERTIFICATE OF CORRECTION

PATENT NO. : 4,250,521
DATED : Feb. 10, 1981
INVENTOR(S) : David I. Wright

It is certified that error appears in the above—identified patent and that said Letters Patent is hereby corrected as shown below:

On the title sheet, in the Abstract, lines 3 and 4 "liminance" should read --luminance--

Column 3, line 24, "10th" second occurrence should read --10--.
Column 3, line 52, that portion reading "YL+Q" should read --Y+Q--. Column 11, line 1, that portion reading "signals" should read --signal--.

Signed and Sealed this

Twenty-eighth Day of July 1981

[SEAL]

Attest:

GERALD J. MOSSINGHOFF

Attesting Officer

Commissioner of Patents and Trademarks